US011500940B2

(12) United States Patent
Werner et al.

(10) Patent No.: US 11,500,940 B2
(45) Date of Patent: Nov. 15, 2022

(54) EXPANDING OR ABRIDGING CONTENT BASED ON USER DEVICE ACTIVITY

(71) Applicant: INTERNATIONAL BUSINESS MACHINES CORPORATION, Armonk, NY (US)

(72) Inventors: John S. Werner, Fishkill, NY (US); Arkadiy O. Tsfasman, Wappingers Falls, NY (US); Tyler Gross, New York, NY (US); Brandon M. Kobilka, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/992,348

(22) Filed: Aug. 13, 2020

(65) Prior Publication Data

US 2022/0050878 A1 Feb. 17, 2022

(51) Int. Cl.
*G06F 16/903* (2019.01)
*G06F 40/295* (2020.01)
*G06F 40/49* (2020.01)
*G06F 16/904* (2019.01)

(52) U.S. Cl.
CPC ...... *G06F 16/90344* (2019.01); *G06F 16/904* (2019.01); *G06F 40/295* (2020.01); *G06F 40/49* (2020.01)

(58) Field of Classification Search
CPC .. G06F 16/903; G06F 16/9038; G06F 16/972; G06F 40/169; G06F 40/237; G06F 40/279; G06F 16/90344; G06F 16/904; G06F 40/295; G06F 40/49
See application file for complete search history.

(56) References Cited

U.S. PATENT DOCUMENTS

| 6,311,185 | B1 * | 10/2001 | Markowitz | G06Q 30/02 705/14.49 |
| 7,734,631 | B2 * | 6/2010 | Richardson | G06F 16/957 707/749 |
| 8,073,861 | B2 | 12/2011 | Cundiff et al. | |
| 8,583,641 | B2 | 11/2013 | Choe et al. | |
| 8,838,564 | B2 | 9/2014 | Sahni et al. | |
| 9,678,618 | B1 | 6/2017 | Schrock et al. | |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Wilson W Tsui
(74) *Attorney, Agent, or Firm* — Teddi E. Maranzano

(57) ABSTRACT

A method, system and computer program product are provided. For each keyword that is visible on a display device, scanning the content that is stored on a user device, or is accessed from a network connection to identify and extract keywords. Further provided is cross-referencing the extracted keywords with a corpus of scored keywords. Based on the extracted keywords being found in the corpus of scored keywords, expanding and/or abridging any of the extracted keywords based on a score in the corpus of scored keywords prior to displaying the modified content on the display device. wherein the extracted keywords match a keyword in the corpus.

10 Claims, 6 Drawing Sheets

(56) References Cited

U.S. PATENT DOCUMENTS

| | | | |
|---|---|---|---|
| 9,705,998 B2 | 7/2017 | Krishnaswamy et al. | |
| 10,076,495 B2 | 9/2018 | Chowdhury | |
| 10,373,207 B2 | 8/2019 | Jayaram et al. | |
| 2005/0193335 A1* | 9/2005 | Dorai | G06F 16/972 715/234 |
| 2007/0073690 A1* | 3/2007 | Boal | G06Q 30/0241 |
| 2012/0054646 A1* | 3/2012 | Hoomani | A63F 13/87 715/758 |
| 2012/0078895 A1 | 3/2012 | Chu-Carroll et al. | |
| 2014/0059411 A1* | 2/2014 | Or-Bach | G06F 16/5846 715/201 |
| 2014/0193796 A1* | 7/2014 | Dodelson | G09B 5/10 434/365 |
| 2015/0242391 A1* | 8/2015 | Goel | G06F 40/30 704/9 |
| 2015/0324342 A1* | 11/2015 | Chin | G06F 16/9535 715/231 |
| 2016/0261701 A1 | 9/2016 | Dhawan et al. | |
| 2017/0228462 A1 | 8/2017 | Zhu et al. | |
| 2017/0249668 A1* | 8/2017 | Delort | G06Q 30/0269 |
| 2018/0060287 A1 | 3/2018 | Srinivasan et al. | |
| 2018/0107663 A1 | 4/2018 | Lewis et al. | |
| 2018/0365230 A1 | 12/2018 | Jang | |
| 2019/0005121 A1 | 1/2019 | Chi et al. | |
| 2020/0364294 A1* | 11/2020 | Brown | G06F 40/263 |

OTHER PUBLICATIONS

Jeong et al., "Efficient Keyword Extraction And Text Summarization For Reading Articles On Smart Phone", Computing and Informatics, vol. 34, pp. 779-794, 2015.

Cao et al., "Feedback-driven Result Ranking and Query Refinement for Exploring Semi-structured Data Collections", EDBT 2010, pp. 3-14, Mar. 22-26, 2010.

Powell, "Similarity Based Document Keyword Extraction Using an Abridged WordNet Noun Taxonomy", Oxford Brookes University, pp. 1-25, 2004.

Luthra et al., "A Statistical Approach of Keyword Extraction for Efficient Retrieval", International Journal of Computer Applications, vol. 168, No. 7, pp. 31-36, Jun. 2017.

* cited by examiner

EXPANDING OR ABRIDGING CONTENT BASED ON USER DEVICE ACTIVITY

BACKGROUND

Embodiments of the invention generally relate to computer systems, and more specifically to expanding or abridging content based on user device activity.

As a user reads through content, such as a web page, presentation, or article, the user may encounter one or more unfamiliar terms. To understand the unfamiliar terms, the user can open additional browser windows and tabs and search for information to understand terms in the original content. However, this can result in confusion if several additional windows and tabs are opened to understand the basic concepts of the original content. Additionally, a user who is knowledgeable may find it inconvenient and time consuming to filter through and skip the extra content.

An efficient approach to expand or abridge content can improve the user understanding of the content while avoiding unnecessary confusion.

SUMMARY

Among other things, a method is provided. For each keyword that is visible on a display device, the method scans the content that is stored on a user device, or is accessed from a network connection to identify and extract keywords. Further provided is cross-referencing the extracted keywords with a corpus of scored keywords. Based on the extracted keywords being found in the corpus of scored keywords, expanding and/or abridging any of the extracted keywords based on a score in the corpus of scored keywords prior to displaying the modified content on the display device. wherein the extracted keywords match a keyword in the corpus.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

Figure 1:
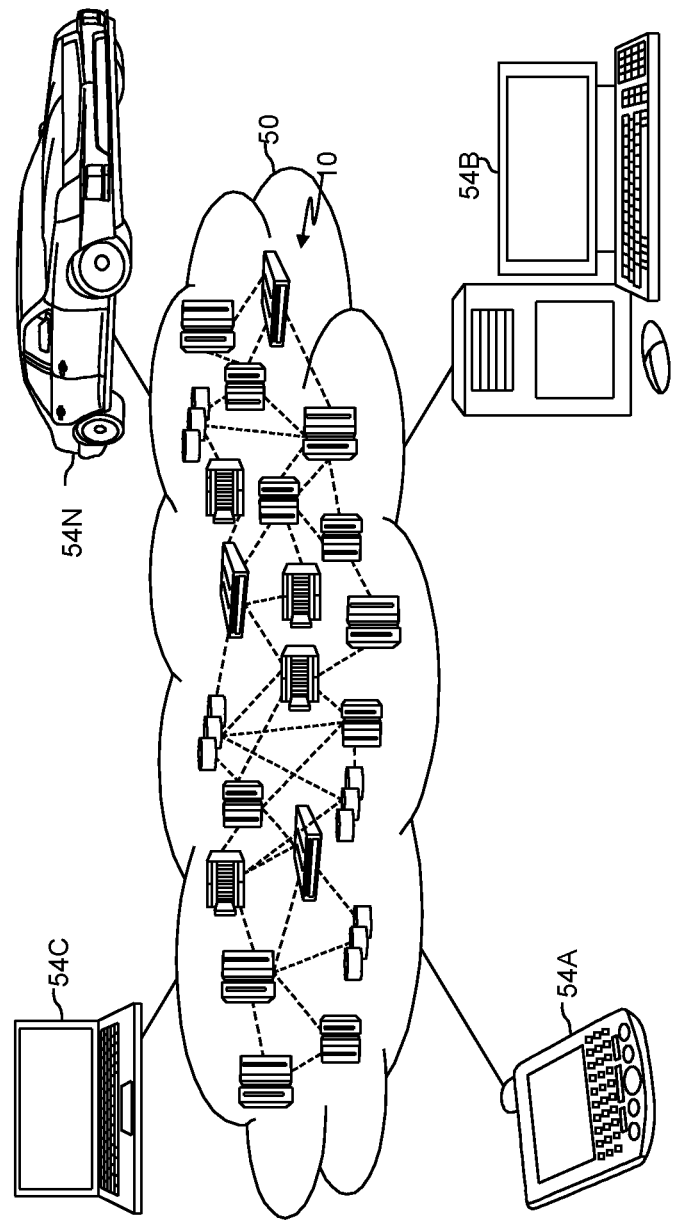
FIG. 1 depicts a cloud computing environment according to an embodiment of the present invention.

The present disclosure relates generally to the field of user computing technologies, and in particular to expanding or abridging content based on user device activity.

A user reading a content, on a device that can be connected to a network may encounter one or more unfamiliar terms. To understand the unfamiliar terms, the user can open additional browser windows and tabs and search for information to understand terms in the original content. However, this can result in confusion if several additional windows and tabs are opened to understand the basic concepts of the original content. In this context, "content" includes documents, spreadsheets, presentations that are prepared in Microsoft® Office, Apache OpenOffice™, the Adobe Portable Document Format, and similar document processing tools. "Content" also includes video and audio sources, including Google News™, Apple News®, Microsoft News, Flipboard, YouTube, various blogs and podcasts, and delivery mechanisms such as various web browsers.

In particular, searching for a term while reading content can result in at least one browser window being opened, thereby potentially causing the user to alternate between the content and the browser window. Depending on the complexity of the content, and the size of the screen of the device, the user can become frustrated at the perceived waste of time. An alternative but similar problem is excessive descriptive content within a content that may be helpful to some users, while other users would prefer to omit the extraneous content because the concepts are well understood.

In current practice, the user likely has one or more additional windows and tabs open to research terms within a content. However, extracting keywords from a content, scoring each keyword by one or more criteria, and expanding or abridging the content based on the scoring can efficiently expedite the user's comprehension of the content.

Embodiments of the invention will now be described in more detail in connection with the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
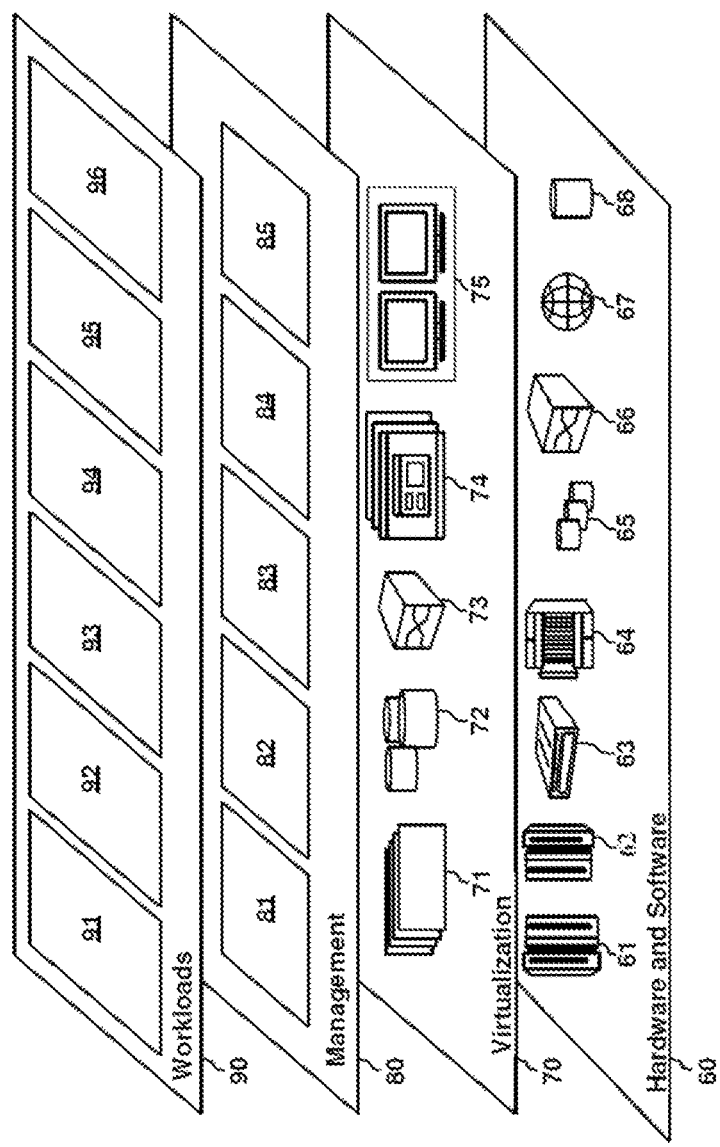
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive computing 96 in an application for expanding or abridging content based on user device activity.

Figure 3:
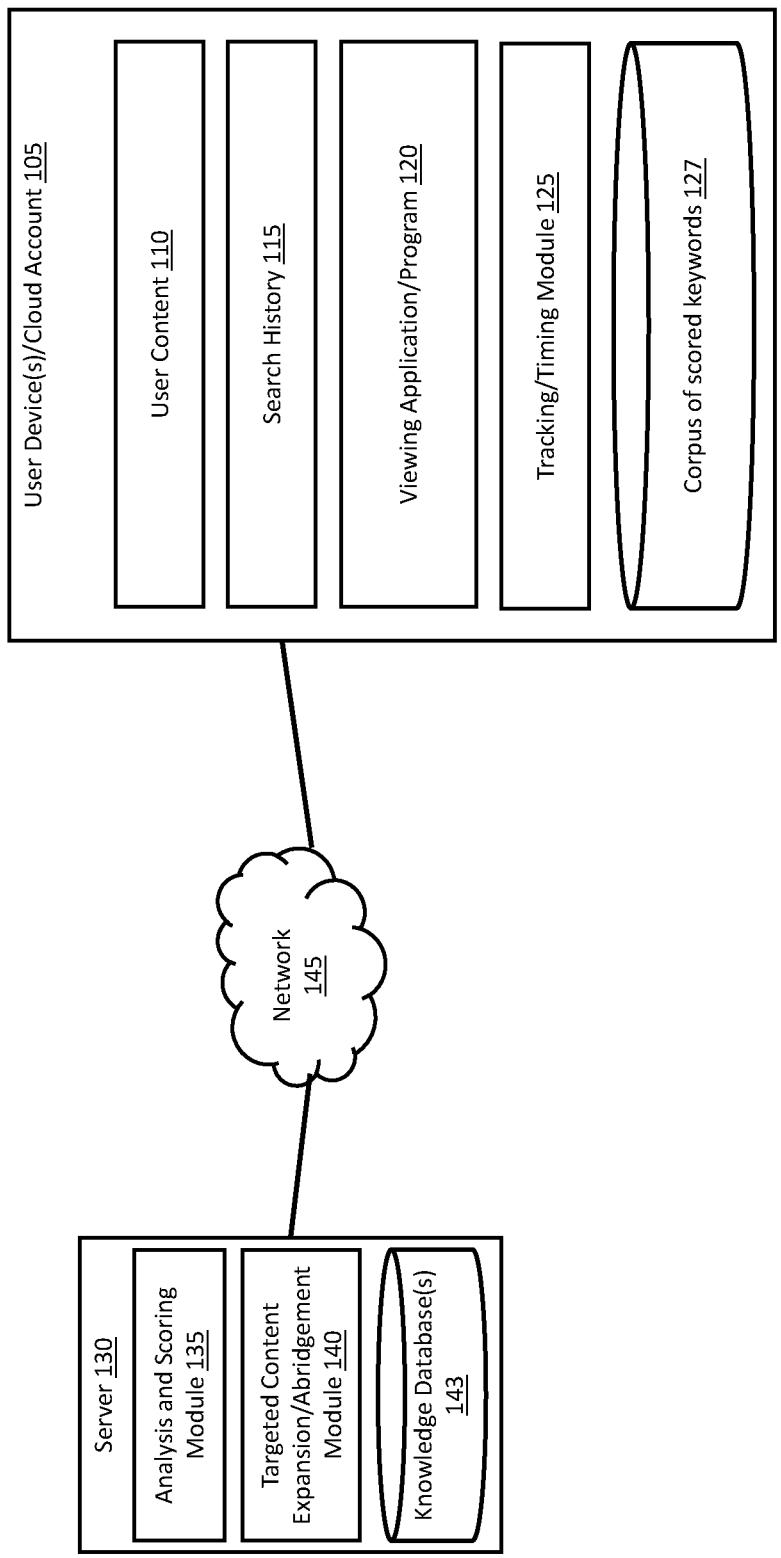
FIG. 3 is a functional block diagram of an illustrative system, according to an embodiment of the invention.

FIG. 3 is a functional block diagram of an illustrative system for expanding and abridging content based on user device activity (hereinafter "system"), according to an embodiment of the invention. The system includes one or more user devices 105, one of which is shown. The user devices includes a laptop, desktop, mobile phone, tablet, or other similar devices capable of connecting to a network, such as network 145. The user may also have a cloud account which can be considered as a user device 105. Therefore, references to the user device 105 includes references to a cloud account. The system further includes a server 130 interconnected via wired and/or wireless network 145. The user device 105 further comprises content 110, search history 115, viewing application/program 120 (viewing application), tracking/timing module 125 (tracking module), and a corpus of scored keywords 127 (corpus).

The content 110 can be any content, such as that listed above, that is viewed, created by, or saved to the user device 105.

The search history 115 may include a history of any web-based searches performed, such as within a web browser.

The viewing application 120 can be any standalone program, including those listed above with reference to "content". A portion of the viewing application 120 can be installed as a web browser plugin that cooperates with the analysis scoring module 135 (analysis module) to build the knowledge database 143 and the targeted content expansion/abridgement module 140 (content module) to enable the user to view the modified content, either expanded or abridged.

The tracking/timing module 125 (tracking module) analyzes how long a user is viewing or interacting with the content 110, including any content from the search history 115 and what content was viewable. Interaction includes detection of a user scrolling, clicking, capacitive detection of a finger/stylus near a touchscreen, cameras, and eye tracking.

The corpus 127 is a database that contains the scores for all keywords encountered on the user device 105. As will be described with reference to FIG. 5, the analysis module 135 creates the corpus 127, which the content module 140 then uses to determine whether to expand or abridge content.

The server 130 is comprised of the analysis module 135, the content module 140, and the knowledge database 143.

The analysis module 135 receives and records information from the user device 105, particularly the user's interactions with the content displayed on the user device 105. The received information can be recorded on the user device 105 either in RAM, or on a storage device. Interactions include user activities, such as scrolling, clicking, capacitive detection of a finger/stylus near a touchscreen, cameras, and eye tracking. The analysis module 135 scans through the content that is displayed on the user device 105 to identify keywords and assign a score based on whether it was written or read, duration of time spent reading a document/web page, and the number of times the user has encountered the keyword. The analysis module 135 is described further with reference to FIG. 4.

The content module 140 analyzes new content as the user opens it on the user device 105. The viewing application 120 may only have access to documents within itself. For example, a web browser may only be able to access content displayed from its web pages, but not content that is displayed in a spreadsheet. A program of the Microsoft® Office suite may only be able to access content being displayed within the active program of the suite. Where APIs are available, the viewing application 120 may access content from another program using the exposed APIs. For example, a web browser having API access may provide content viewing from a file created by a program of the Microsoft® Office suite, where both Microsoft® Office program and the web browser allow customization through their respective APIs.

The content module 140 performs expansion of content where the keyword score is below a configurable threshold, and performs abridgement of content where the keyword score is above a configurable threshold. Abridgement refers to the removal of descriptive content for a word, concept, or token having a high user score in the user's corpus 127.

Expansion refers to further detail related to a word, concept, or token. Expansion can be simply an additional sentence, such as a dictionary definition, but can include more comprehensive additions, such as one or more paragraphs. The additions (expansions) are made depending on the score of the word, concept, or token in the corpus 127. The content module 140 is described further with reference to FIG. 5.

The knowledge database 143 includes one or more databases that contain additional content. The content module 140 uses the additional content to expand an identified keyword having a low score in the corpus 127, or to abridge viewed content based on the identified keyword having a high score in the corpus 127.

The additional content in the knowledge database 143 can include whole works, such as a dictionary, encyclopedia, product documentation manuals, web pages, or Wikipedia. In addition to whole works, the knowledge database 143 includes links to data that can be used to expand or abridge keywords and the keywords that are associated with the links. If expansion is required, content is copied from the knowledge database 143 and inserted into the content that is displayed on the user device 105. Descriptive information from the viewed content can be compared to content in the knowledge database 143 to determine which portions can be abridged as well. To ensure the content in the knowledge database 143 remains current, periodically the content module 140 synchronizes the knowledge database 143 with the original sources. For links stored in the knowledge database 143, the content module 140 attempts to access each link. Where the link is no longer found, the content module 140 can delete the link or create an error report for the user, as example actions.

Figure 4:
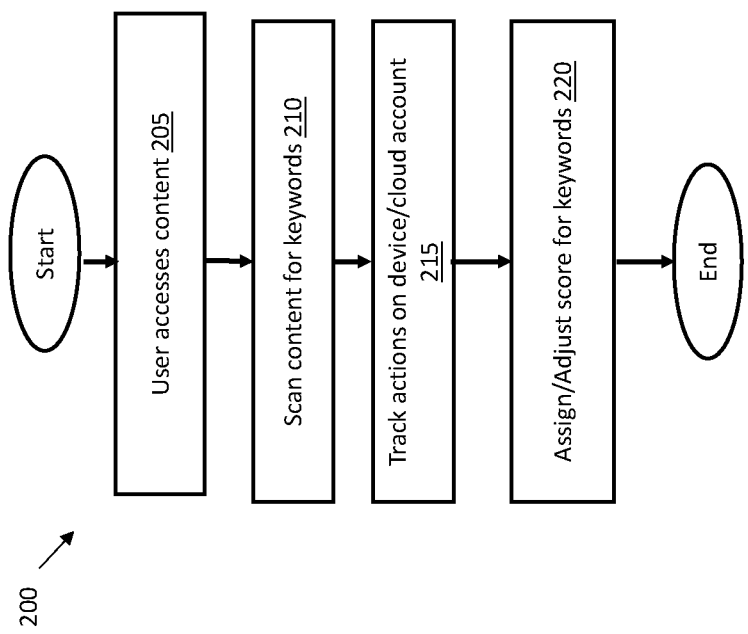
FIG. 4 is a flowchart of analyzing and scoring keywords in content.

FIG. 4 illustrates an exemplary flowchart 200 of analysis and scoring in the user device 105. The server 130 executes the method of flowchart 200, which analyzes any of the content 110 and the search history 115 to extract keywords. A score is assigned to the keywords based on device interaction. To distinguish, the content 110 and the search history 115 are resident on the user device 105. However, the flowcharts of FIG. 4-5 also apply to content the user device 105 accesses through a network connection, such as network 145.

The score is based on several factors, such as the number of times the keywords appear on the screen, how long (amount of time) the keywords were on the screen, in how many different documents was the keyword encountered, and how many times the user has written the keyword.

At 205, the user device 105 executes viewing application 120 to access content, in response to the user of the user device 105 opening the content. The content can be physically located on the user device 105, which includes any device linked to the user's cloud account. Alternatively, the content can be online, although being viewed on the user device 105 (i.e., the visible content).

At 210, the analysis module 135 scans the content displayed on the user device 105 to identify and extract keywords. The scanning and analysis occurs in real-time because the user may only look at one section of the document, such as only chapter 2 of a PDF textbook. Since only the keywords that are visible to the user are analyzed, analysis of the entire textbook is inefficient and not needed. Machine learning applications such as IBM Watson™ Discovery and IBM Watson™ Explorer apply learning techniques, including natural language processing, to recognize keywords within the visible content that are necessary to the understanding of the overall document. Visible keywords are those that are in content that is not minimized, and that are not covered by another window on top, blocking content from being viewed.

These, and other similar, machine learning applications, can ingest whole works, such as an encyclopedia, as training input. The results of the training comprise the corpus 127. This initial training is not performed in real time. However, the results of the keyword analysis that occurs during the execution of the tracking module 125 and analysis module 135 do occur in real time, thus improving the overall training.

The machine learning applications use keywords that the analysis module 135 identified in 210 to analyze web-based input and to extract links referring to the identified keywords. This expands the knowledge database 143 of additional content and the corpus 127 of scored keywords by adding to the corpus 127 the keywords found in the content that do not currently appear in either one, along with their associated links where the keywords can be accessed. However, the corpus 127 can include content beyond only links, such as documents and whole works, i.e., books. It can be noted that during the analyzing, certain parts of speech, such as pronouns, prepositions, and conjunctions, can be omitted. In embodiments where audio and/or video are used as content, other IBM Watson™ APIs, such as Visual Recognition and Speech to Text are included in the analysis module 135 and are invoked by the viewing application 120 to identify keywords and or key visual or audio objects.

At block 215, actions on one or more user devices 105, including user devices 105 that are linked together through a cloud account are tracked. The tracking is invoked by the viewing application 120 and is carried out by tracking/timing module 125 (tracking module). The output of the tracking module 125 is sent to the analysis module 135 to adjust the scoring of encountered keywords. For example, AI-powered behavioral analytics solutions such as IBM Tealeaf® track website interaction by monitoring the user's reading speed on all types of documents. Over time the analysis results in an average reading speed for individual users.

This interaction includes event data, such as the navigation path through a website or page, page clicks, tracking movement through content that was visible on one or more displays, the length of time the content was displayed, scrolling speed, and mouse/pointer movement. In an alternate embodiment a device camera, such as a mobile device camera, built in laptop camera, or external camera can be used to track whether the user was present, which user was using the user device 105, facial expressions that may indicate comprehension or confusion, and may track user eye movement for a more accurate sense of what content was consumed.

At block 220, the analysis module 135 assigns a score for identified keywords that are new and not previously encountered by the user device 105. The analysis module 135 first checks the corpus 127. If the keyword is not found, it will be added and a score will be calculated. Additionally, the analysis module 135 can adjust the score up or down in the corpus 127 for previously identified keywords. The score may change depending on which analysis system is used. For example, the IBM Watson™ Natural Language Understanding API assigns a score between −1 and 1. Therefore, a high score can be above 0.5 while a low score can be below −0.5.

Factors tending to a high score for a given keyword include continuous scrolling at the user's average reading speed past the keyword one or more times, not opening additional tabs or searching for additional information on the keyword, and, where available, facial analysis showing no signs of confusion. Eye tracking provides the user's exact location in the content at a given time. Other techniques can be used if eye tracking is not available to see if a certain keyword was searched and what keywords were visible on the display. The user's average reading speed is used to narrow down where the user likely is viewing within the visible window. If the user opens a new tab to perform a search, the analysis module 135 captures the search terms, which are an indication that the user needs more familiarity with a particular term or terms. Keywords that were visible but passed over can indicate the user has sufficient familiarity.

Over time, through continuous learning, the system adapts to the user. For example, a user may learn a keyword because of in-depth research performed for a project. However, one year from now, the user may be less familiar with that keyword, especially through non-use. Based on the last score in the corpus 127, the system presumes the user has a high familiarity with the keyword. However, if the user briefly opens a tab as a memory refresher, the score for that keyword will be lowered. The user may still occasionally research the keyword as a reminder, but spend less time doing so. Eventually, the user may encounter the keyword and not need to click it at all showing that future expansion of the term may not be needed, and increasing the keyword score.

The system makes some assumptions based on keywords that commonly appear near each other early on in use of the system to prevent every word being expanded. As an example, if the user device 105 identifies the words "resistor, inductor, and capacitor" in a sentence or paragraph, rather than expanding each one individually, the system may show an expansion of "passive electrical components". The assumptions are made based on the continuous learning and improvement of the corpus 127.

Examples that may lead to a low score for a given keyword include pausing or a change in scrolling speed when the keyword is encountered, performing additional searches on the keyword or content related to the keyword, and, where available, facial analysis showing signs of confusion. Multiple keywords will likely be visible at any given time.

The score for a keyword may change over time. For example, the user device 105 may detect that a link is clicked, possibly indicating unfamiliarity with a keyword, and lower score for the keyword. A user hovering over a keyword can lower the scoring because it may indicate that the user is unfamiliar with the keyword. Over time, as the keyword is encountered again, the user device 105 may detect less time researching the keyword each time the keyword is encountered, thereby raising the score. In addition to tracking behavior, IBM Tealeaf® provides an output for each document that the user accesses, including scorecards, reports, and an activity summary. IBM Tealeaf® allows user customization to improve the output.

Duplicates will likely be encountered, which impacts keyword scoring. For example, if a keyword is mentioned "10" times in a first content, the keyword is likely a main topic within the content, and a higher score will be given for that keyword. In contrast, if the user only encounters the keyword once in a second content, the content is likely about a different topic, so there will likely be less description around the keyword.

Figure 5:
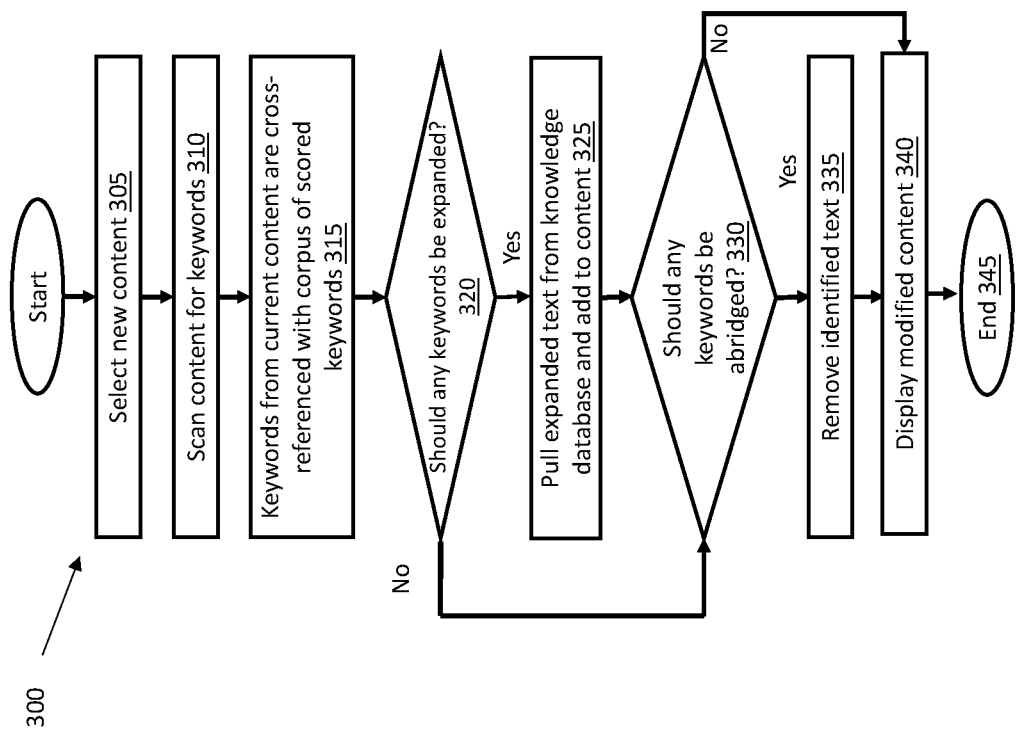
FIG. 5 is a flowchart of targeted content expansion or abridgement, according to an embodiment of the invention.

FIG. 5 is an exemplary flowchart 300 illustrating targeted content expansion or abridgement, according to an embodiment of the invention. The user device 105 executes the flowchart of method 300 when the user device 105 detects the initial opening of a content, such as a document or web page, to expand or abridge before the content is presented on the user device 105. That is, at 305, upon the user device 105 detecting a click on a link, for example, the content found at that link is adjusted accordingly and the resulting content is displayed on the user device 105.

At block 310 the document is scanned to extract keywords, in a manner similar to that previously described with reference to 210 of FIG. 4, where the analysis module 135 scans the content to identify and extract keywords.

At block 315, the analysis module 135 cross-references keywords extracted and identified in the current document to the corpus of scored keywords 127. The context in which the keywords are used can also be considered using context variables with various IBM Watson™ APIs. For example, the word "net" may already exist in the corpus 127 in reference to fishing, but may be a first impression in association with traces on a printed circuit board.

At 320 the content module 140 determines if any keywords should be expanded, meaning that additional content is added to the open content on the user device 105. Content may be expanded if the corpus 127 either has no score for the keyword, or has a score below a predetermined expansion threshold.

If the content module 140 determines that keywords should be expanded (block 320 "Yes" branch), expanded text is pulled from knowledge database 143 and added to the content at block 325. The amount of expansion depends on the current score for the identified keyword within the corpus 127. For example, if no score is recorded for the keyword, a full paragraph may be added to the document. However, as the score increases, progressively less expansion is performed because the increased score indicates familiarity with the keyword. The additional text may be flagged to display differently, such as in a different color, so that it is apparent that it was not part of the original content. Also, the original content is not permanently altered.

After executing block 325 or if there are no keywords to expand (block 320 "No" branch), the content module 140 moves to decision block 330 to determine if any keywords should be abridged such that content can be removed from the content. Content may be abridged if the a keyword being displayed on the user device 105 has a score above a predetermined abridgement threshold within the corpus 127.

The content added during expansion is also analyzed. For low keyword scores, a large paragraph may be inserted. The analysis of the newly inserted content is performed prior to displaying the end result on the user device 105. This is because there may be keywords in the newly inserted content that have a high user score above the abridgement threshold in the corpus 127. In that case, one or two sentences from the newly inserted content may be removed. Therefore, the large paragraph minus the one or two sentences containing the familiar keywords is the final content that is displayed to the user device 105 at 340. For this reason, the abridgement process occurs after the expansion process because it is possible that some of the added content at block 325 may not be needed.

If it is determined that keywords relate to content that can be abridged (block 330 "Yes" branch), the content module 140 moves to block 335 to remove the identified text from the content. The identified text may be any text relating to a description or explanation of the identified keyword, such as the sentence or paragraph where the keyword was mentioned. If other keywords exist in the identified text that have scores below the abridgment threshold, the text may not be removed from the document. An identifier may be included in the final content letting the user know that content was removed from the document. The identifier, such as a label or icon, allows the user to expand the section to see the original text if desired. The content module 140 can learn from this action of expanding the abridged content and adjust the scoring of the keyword in the corpus 127.

After executing block 335 or if there are no keywords that relate to content that can be abridged (block 330 "No" branch), the content module 140 moves to block 340 to display the modified content on the user device 105 before ending at block 345.

The flowchart 300 of FIG. 5 executes when a new content is launched but before it is displayed to the user device 105. Once the modified content is displayed, the flowchart 200 of FIG. 4 is executed on the modified content. New content, i.e., abridged or expanded, is not displayed to the user device 105. However, keywords are extracted from the modified content and new or modified keyword scores are calculated.

Figure 6:
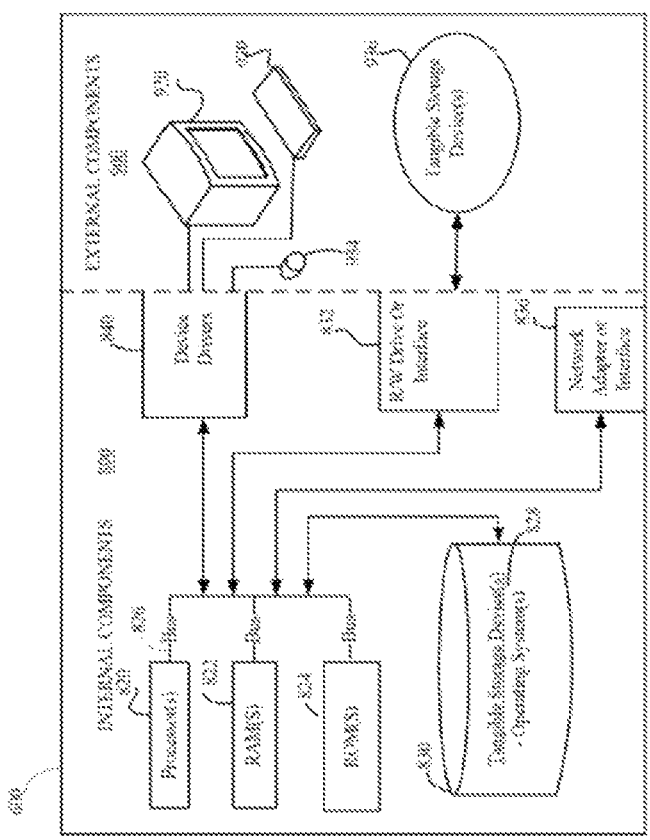
FIG. 6 is an illustrative functional block diagram of a computing device for implementing aspects of the present invention, according to an embodiment of the invention.

FIG. 6 illustrates an exemplary computing device 600 applicable for executing the algorithm of FIGS. 4-5. Computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the algorithm of FIGS. 4-5; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
    for each particular keyword that is visible on a display device;
    scanning content that is stored on a user device, or is accessed from a network connection to identify and extract keywords;
    cross-referencing each of the extracted keywords with a corpus of scored keywords; and
    based on the extracted keywords being found in the corpus of scored keywords, expanding and/or abridging the extracted keywords based on a score in the corpus of scored keywords prior to displaying a modified content on the display device, wherein each of the extracted keywords match a keyword in the corpus, wherein the expanding is in response to either no score being found in the corpus of scored keywords or the score found in the corpus of scored keywords being below a configurable expansion threshold, and wherein the expanding further comprises:
    retrieving from a knowledge database content associated with the particular keyword and adding an amount of the retrieved content to the content that is open on the display device, wherein an amount of added content is based on the keyword score, and decreases as the score associated with the keyword increases;
    extracting keywords from the added amount of the retrieved content;
    removing a portion of the added content, based on encountering a keyword from the extracted keywords that exceed a threshold;
    displaying a modified content on the display device; and
    updating the score associated with the particular keyword in the corpus.

2. The method of claim 1, wherein the scanning is performed in real-time and is performed only on the keywords that are visible on the display device.

3. The method of claim 1, wherein an initial training of the corpus of scored keywords is not performed in real time; and
    results of keyword analysis during scanning of content on the user device is performed in real time and used to update the keyword scores in the corpus, and wherein data associated with new keywords is added to the knowledge database.

4. A computer program product, wherein the computer program product comprises a computer readable storage medium having program instructions embodied therewith, the program instructions executable by a processing unit to cause the processing unit to perform a method comprising:
    for each particular keyword that is visible on a display device;
    scanning content that is stored on a user device, or is accessed from a network connection to identify and extract keywords;
    cross-referencing each of the extracted keywords with a corpus of scored keywords;
    based on the extracted keywords being found in the corpus of scored keywords,
        expanding and/or abridging any of the extracted keywords based on a score in the corpus of scored keywords, wherein each of the extracted keywords match a keyword in the corpus, wherein the expanding is in response to either no score being found in the corpus of scored keywords or the score found in the corpus of scored keywords being below a configurable expansion threshold, and wherein the expanding further comprises:
    retrieving from a knowledge database content associated with the particular keyword and adding an amount of the retrieved content to the content that is open on the display device, wherein an amount of added content is based on the keyword score, and decreases as the score associated with the keyword increases;
    extracting keywords from the added amount of the retrieved content;
    removing a portion of the added content, based on encountering a keyword from the extracted keywords that exceed a threshold;
    displaying a modified content on the display device; and
    updating the score associated with the particular keyword in the corpus.

5. The computer program product of claim 4, wherein the scanning is performed in real-time and is performed only on the keywords that are visible on the display device.

6. The computer program product of claim 4, wherein an initial training of the corpus of scored keywords is not performed in real time; and results of keyword analysis during scanning of content on the user device is performed in real time and used to update the keyword scores in the corpus, and wherein data associated with new keywords is added to the knowledge database.

7. A computer system, comprising:
one or more processors; and a computer-readable memory coupled to the one or more processors, the computer-readable memory comprising instructions for:
for each particular keyword that is visible on a display device;
scanning content that is stored on a user device, or is accessed from a network connection to identify and extract keywords;
cross-referencing each of the extracted keywords with a corpus of scored keywords; and
based on the extracted keywords being found in the corpus of scored keywords,
expanding and/or abridging any of the extracted keywords based on a score in the corpus of scored keywords, wherein each of the extracted keywords match a keyword in the corpus, and wherein the expanding further comprises:
retrieving from a knowledge database content associated with the keyword and adding an amount of the retrieved content to the content that is open on the display device, wherein an amount of added content is based on the keyword score, and decreases as the score associated with the keyword increases;
extracting keywords from the added amount of the retrieved content;
cross-referencing the extracted keywords with the corpus of scored keywords;
removing a portion of the added content, based on encountering a keyword from the extracted keywords in the added content that exceed a threshold;
displaying the modified content on the display device; and
updating the score associated with the particular keyword in the corpus.

8. The computer system of claim 7, wherein the expanding is in response to no score being found in the corpus of scored keywords or the score in the corpus of scored keywords being below an expansion threshold.

9. The computer system of claim 7, wherein the scanning is performed in real-time and is performed only on the keywords that are visible on the display device.

10. The computer system of claim 7, wherein an initial training of the corpus of scored keywords is not performed in real time; and
results of keyword analysis during scanning of content on the user device is performed in real time and used to update the keyword scores in the corpus, and wherein data associated with new keywords is added to the knowledge database.

\* \* \* \* \*